(12) United States Patent
Bates et al.

(10) Patent No.: US 6,204,845 B1
(45) Date of Patent: Mar. 20, 2001

(54) ERGONOMIC VIEWABLE OBJECT PROCESSOR

(75) Inventors: Cary Lee Bates; Edwin Ernest Burris, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/357,678

(22) Filed: Dec. 16, 1994

(51) Int. Cl.[7] ......................................................... G06F 3/14
(52) U.S. Cl. ............................................. 345/339; 345/342
(58) Field of Search ................................... 395/155, 159, 395/161, 157, 133, 335, 339, 342, 348, 340; 345/145, 335, 339, 342, 348, 340, 433

(56) References Cited

U.S. PATENT DOCUMENTS

| | | | |
|---|---|---|---|
| 4,720,703 | 1/1988 | Schnarel, Jr. et al. | 345/163 |
| 4,725,829 | 2/1988 | Murphy | 345/145 |
| 4,829,292 | 5/1989 | Tokuda | 345/145 |
| 4,847,605 | 7/1989 | Callahan et al. | 345/145 |
| 4,987,551 | 1/1991 | Garrett, Jr. | 345/162 |
| 5,146,211 | 9/1992 | Adams et al. | 345/145 |
| 5,161,212 | 11/1992 | Littleton | 345/418 |
| 5,185,597 | 2/1993 | Pappas et al. | 345/145 |
| 5,227,771 | * 7/1993 | Kerr et al. | 345/340 |
| 5,263,134 | 11/1993 | Paal et al. | 345/342 |
| 5,333,247 | 7/1994 | Gest et al. | 345/438 |
| 5,485,569 | * 1/1996 | Goldman et al. | 707/507 |

* cited by examiner

*Primary Examiner*—Crescelle N. dela Torre
(74) *Attorney, Agent, or Firm*—Steven W. Roth

(57) ABSTRACT

The Viewable Object Processor of the present invention utilizes object handles that allow users to perform operations on windows and other viewable objects (e.g., move or resize a window) without having to depress a key (or key sequence) on a keyboard or a button on a pointing device such as a mouse. Essentially, object handles are specialized regions created on a display screen. Associated with each object handle is a particular geometric shape and a object handle type. The shape of each object handle identifies the bounds of the particular object handle. To perform an operation on a viewable object, a user need only cause the cursor to enter into the object handle region of a handle that corresponds to the operation that the user wishes to perform.

20 Claims, 15 Drawing Sheets

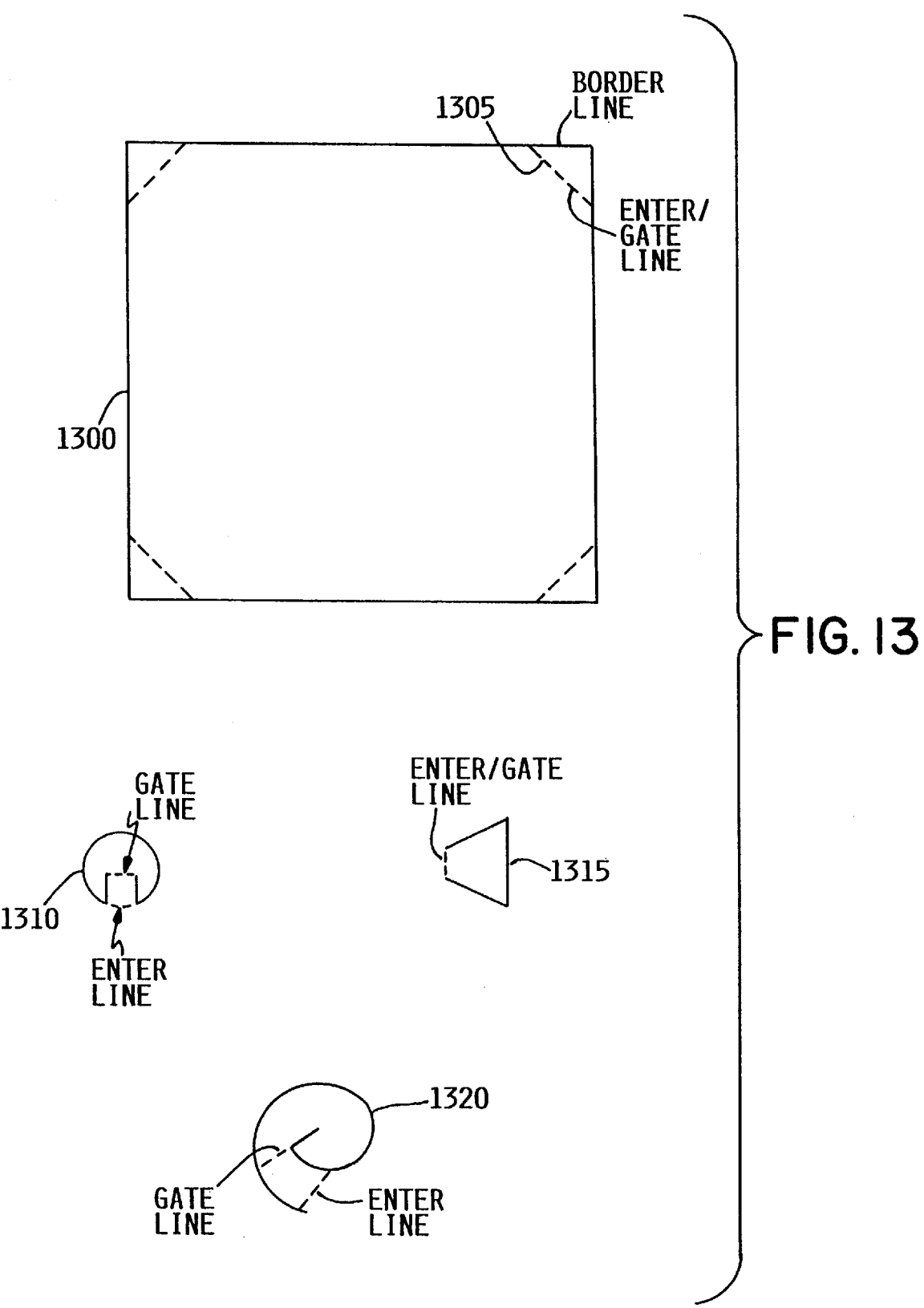

ERGONOMIC VIEWABLE OBJECT PROCESSOR

FIELD OF THE INVENTION

The present invention relates to data processing systems. More particularly, the present invention relates to manipulating objects on the user interface of a computer system.

BACKGROUND OF THE INVENTION

The EDVAC computer system of 1948 is cited by many as the dawn of the computer era. Like modern day computer systems, the EDVAC computer system included an operating system that controlled the computer system's computer programs and a mechanism that allowed users to interact with those computer programs. However, while the EDVAC device was used primarily by scientists and other technical experts, modern day computer systems, such as the IBM Personal System/2, are used by a wide range of individuals with varying skills and backgrounds. The extensive use of today's computer systems is due in large part to improvements in the mechanisms which allow computer system users to interact with the computer system's computer programs (sometimes called the computer system's "user interface"). In fact, the relative ease of use between competitive computer systems is a significant factor in consumer purchase decisions. It is no surprise, then, that computer system makers are constantly striving to improve the ease of use of their respective computer systems.

One of the foremost advances in this ease of use endeavor has been the design of windowing mechanisms. A windowing mechanism splits a computer system's user interface into one or more windows. IBM OS/2 and Microsoft Windows are examples of computer system operating systems which feature a window oriented user interface. Most operating systems create a window each time a computer program (e.g., a word processor such as Microsoft Word for Windows) is started. The user then interacts with the computer program through its associated window. Of course, since many operating systems allow users to run several computer programs at once, users can have access to several windows simultaneously. While this aspect of some windowing mechanisms does potentially yield increased user productivity, it also sometimes requires the user to manipulate the windows (i.e., move them around, change their size and so forth) in order to gain access to different computer programs.

Windowing mechanisms typically include at least one submechanism that allows the user to move windows about the display screen of their computer system, change the size of individual windows, and minimize windows into what are called icons. Many of these submechanisms utilize a mouse or other pointing device to perform these operations. In common computer jargon, some operating systems allow their users to move viewable objects (e.g., windows and/or icons) by using a pointing device to perform what is often called a "drag and drop" operation. Pointing devices typically have cursors that appear on the user's display screen and highlight movement of the pointing device.

When a user wants to move a viewable object from location A to location B, he or she typically moves the cursor of the pointing device to the viewable object to be moved (e.g., at location A), pushes a button on the pointing device, moves the cursor to location B (i.e., "drags" the object to location B), and either pushes the button on the pointing device again or releases the button having held the button down through the whole operation (i.e., "drops" the object).

Like movement submechanisms, resizing submechanisms often entail use of a pointing device and its buttons to effectuate the resizing operation. For example, many submechanisms allow the user to resize a viewable object (usually a window) by moving the cursor to an edge of a window, pushing a button on the pointing device, moving the cursor to a position which approximates the new size of the window, and either pushing the button again or releasing the button after having held the button depressed throughout the entire operation.

While these movement and resizing submechanisms are helpful to computer system users, they have some inherent deficiencies. First, the submechanisms used are not standardized; therefore, users who are familiar with one windowing mechanism are often forced to change to make use of other windowing mechanisms. Second, in some situations these movement and resize operations are performed repeatedly throughout the day, which requires repeated mechanical muscle movement. As many studies have shown, individuals whose jobs require them to repeatedly perform mechanical muscle movement run a greater risk of contracting disabling conditions such as carpal tunnel syndrome.

Without a mechanism which allows computer users to manipulate viewable objects, while at the same time minimizing complexity and repeatable muscle movement, the benefits provided by windowing mechanisms remain limited.

SUMMARY OF THE INVENTION

It is, therefore, a principal object of this invention to provide an enhanced, ergonomic Viewable Object Processor.

It is another object of this invention to provide an enhanced Viewable Object Processor that allows users to move and/or resize viewable objects with a minimum of repeatable muscle movement.

It is still another object of this invention to provide an enhanced Viewable Object Processor that allows users to move and/or resize viewable objects without having to depress a pointing device button or a key on a keyboard.

These and other objects of the present invention are accomplished by the Viewable Object Processor disclosed herein.

The Viewable Object Processor of the present invention utilizes object handles that allow users to perform operations on windows and other viewable objects (e.g., move or resize a window) without having to depress a key (or key sequence) on a keyboard or a button on a pointing device such as a mouse. Essentially, object handles are specialized regions created on a display screen. Associated with each object handle is a particular geometric shape and a object handle type. The shape of each object handle identifies the bounds of the particular object handle. While the present invention is not limited to a particular geometric shape or shapes, object handles are preferably designed such that a user is not likely to inadvertently cause their cursor to enter the associated object handle region. The object handle type identifies the type of operation that is facilitated by the handle (e.g., window movement).

To perform an operation on a viewable object, a user need only cause the cursor to enter into the object handle region of a handle that corresponds to the operation that the user wishes to perform. For example, if a user wants to move a window from one place on his or her display screen to a different place, the user need only use a pointing device (or series of keystrokes) to move their cursor into a object handle region that corresponds to the window movement operation. The user can then move the window by causing the cursor to move to the new location on the display screen. Once the window has been relocated to the desired location, the user need only move the cursor out of the object handle region identified by the object handle (i.e., the geometric shape).

BRIEF DESCRIPTION OF THE DRAWINGS

FIG. 13 shows alternate geometric shapes that could be made to operate with the mechanisms of the present invention.

DETAILED DESCRIPTION

Figure 1:
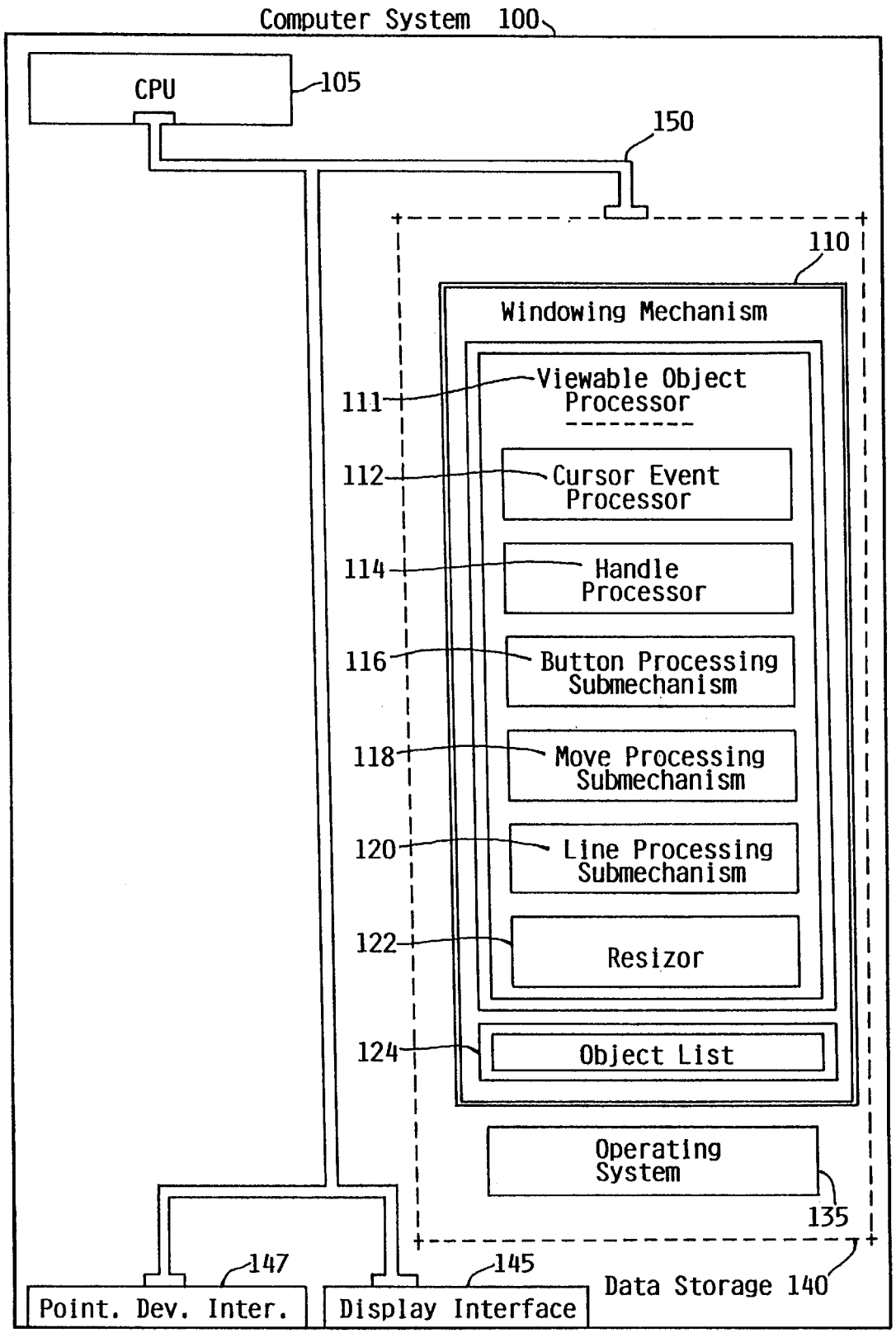
FIG. 1 is a block diagram of the computer system of the present invention.

FIG. 1 shows a block diagram of the computer system of the present invention. The computer system of the preferred embodiment is an enhanced IBM Personal System/2 computer system running the IBM OS/2 Operating System. However, those skilled in the art will appreciate that the mechanisms and apparatus of the present invention apply equally to any computer system, regardless of whether the computer system is a complicated multi-user computing apparatus or a smaller single user device such as a laptop computer. As shown in the exploded view of FIG. 1, computer system 100 comprises main or central processing unit (CPU) 105 connected to data storage 140, display interface 145, and pointing device interface 147 via system bus 150. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data storage 140 contains windowing mechanism 110, Viewable Object Processor 111, cursor event processor 112, handle processor 114, button processing submechanism 116, move processing submechanism 118, line processing submechanism 120, window resizor 122, viewable object list 124, and operating system 135. While data storage 140 is shown as a monolithic entity, it should be understood that it may comprise a variety of devices, and that all programs and files shown will not necessarily be contained in any one device. For example, portions of cursor event processor 112 and operating system 135 will typically be loaded into primary memory to execute, while other files may well be stored on magnetic or optical disk storage devices.

Figure 2:
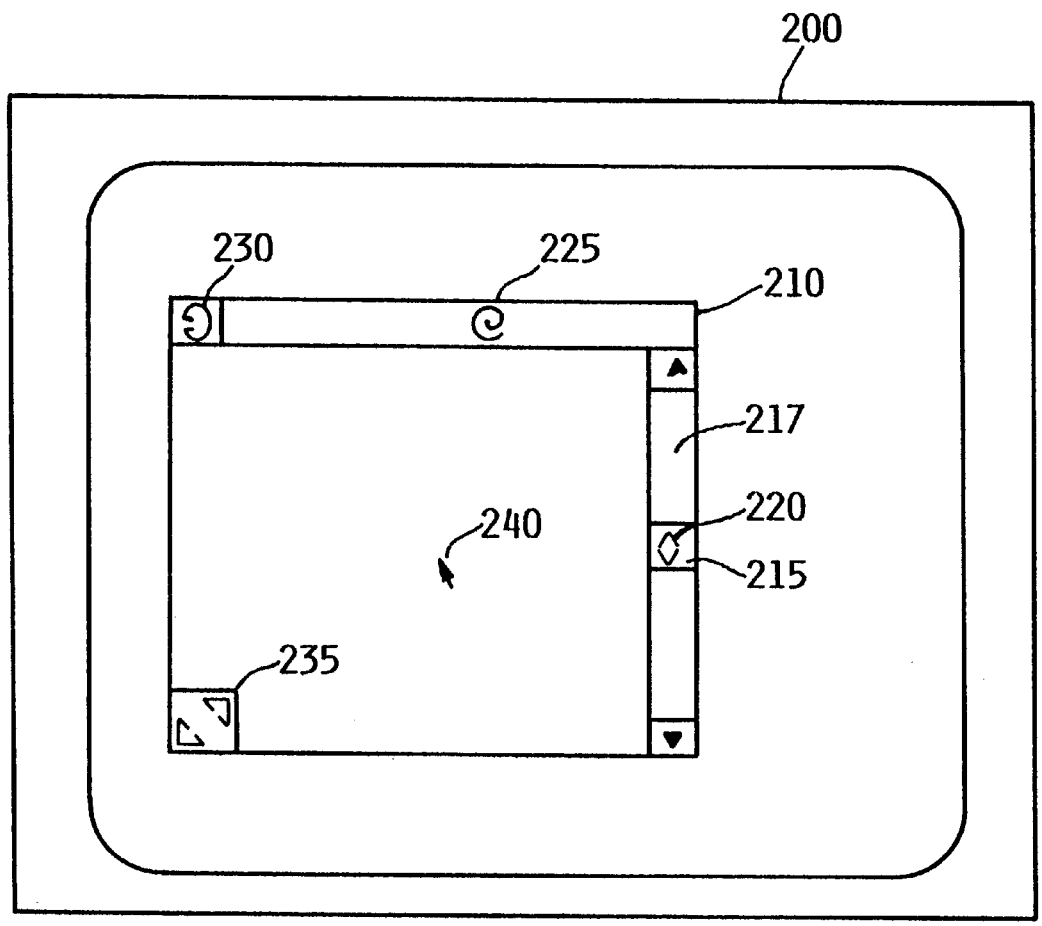
FIG. 2 shows an example display screen and an example window.

FIG. 2 shows an example display screen and an example window. Window 210 is shown on display 200. Window 210 includes several object handles, having a variety of object handle types. Slider handle 220 on slider 215 is used to move slider 215 up and down scroll bar 217. Window handle 225 is used to move window 210 around on display 200. Button handle 230 is used to activate program operations that are associated with the computer program that is executing in window 210. Resizing handle pair 235 is used to change the size of window 210. While windows are used extensively herein to explain the benefits and advantages of the present invention, those skilled in the art will appreciate that this invention applies equally to other viewable objects such as icons.

Figure 3:
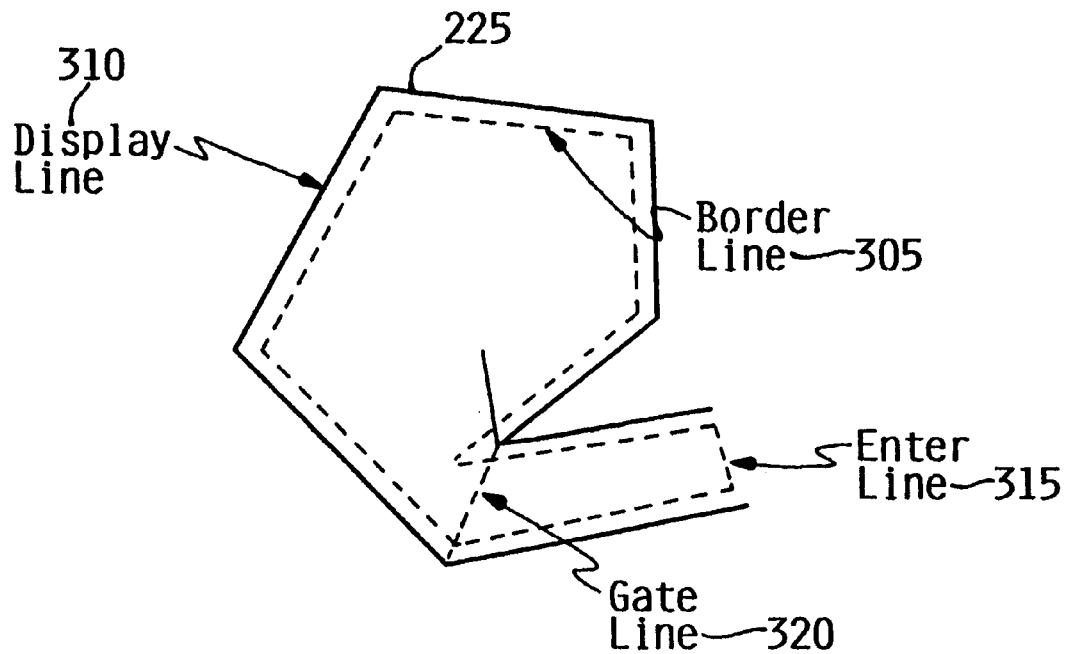
FIG. 3 shows an example geometric shape for identification of a object handle region.

FIG. 3 shows an enlarged view of window handle 225. As shown, window handle 225 comprises display line 310, border line 305, gate line 320, and enter line 315. A user wanting to move window 210 causes cursor 240 to move (i.e., through the use of a pointing device) into the object handle region identified by window handle 225. To do so, the user must cause cursor 240 to track across enter line 315 and gate line 320. The user then moves cursor 240 to the relocation position while engaging border line 305. As the user moves cursor 240, Viewable Object Processor 111 moves window 210 such that it follows cursor 240. To stop the movement, the user moves cursor 240 out of window handle 225 (i.e., back across gate line 320 and enter line 315). At this point, it is important to note that object handles are designed in a way that makes it unlikely that a user would inadvertently enter (or exit from) the object handle (e.g., window handle 225). Please note also that the window handles of the present invention are not limited to the geometric shape shown on FIG. 3. Those skilled in the art will appreciate that other geometric shapes are possible within the spirit and scope of the present invention. See, for example, the geometric shapes depicted on FIG. 13.

Figure 4:
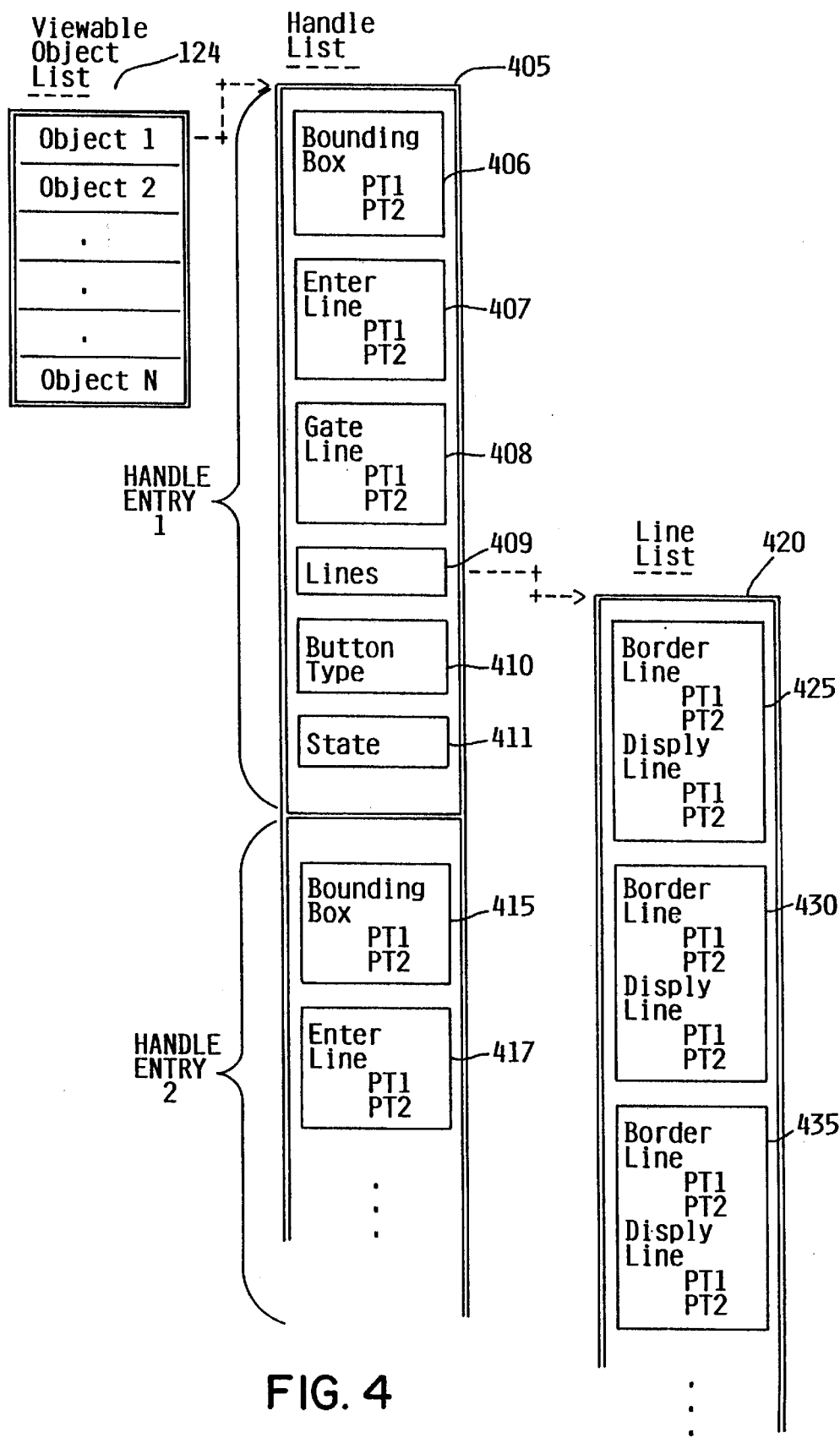
FIG. 4 shows the object list, handle list, and line list data structures accordingly to the preferred embodiment.
Figure 12:
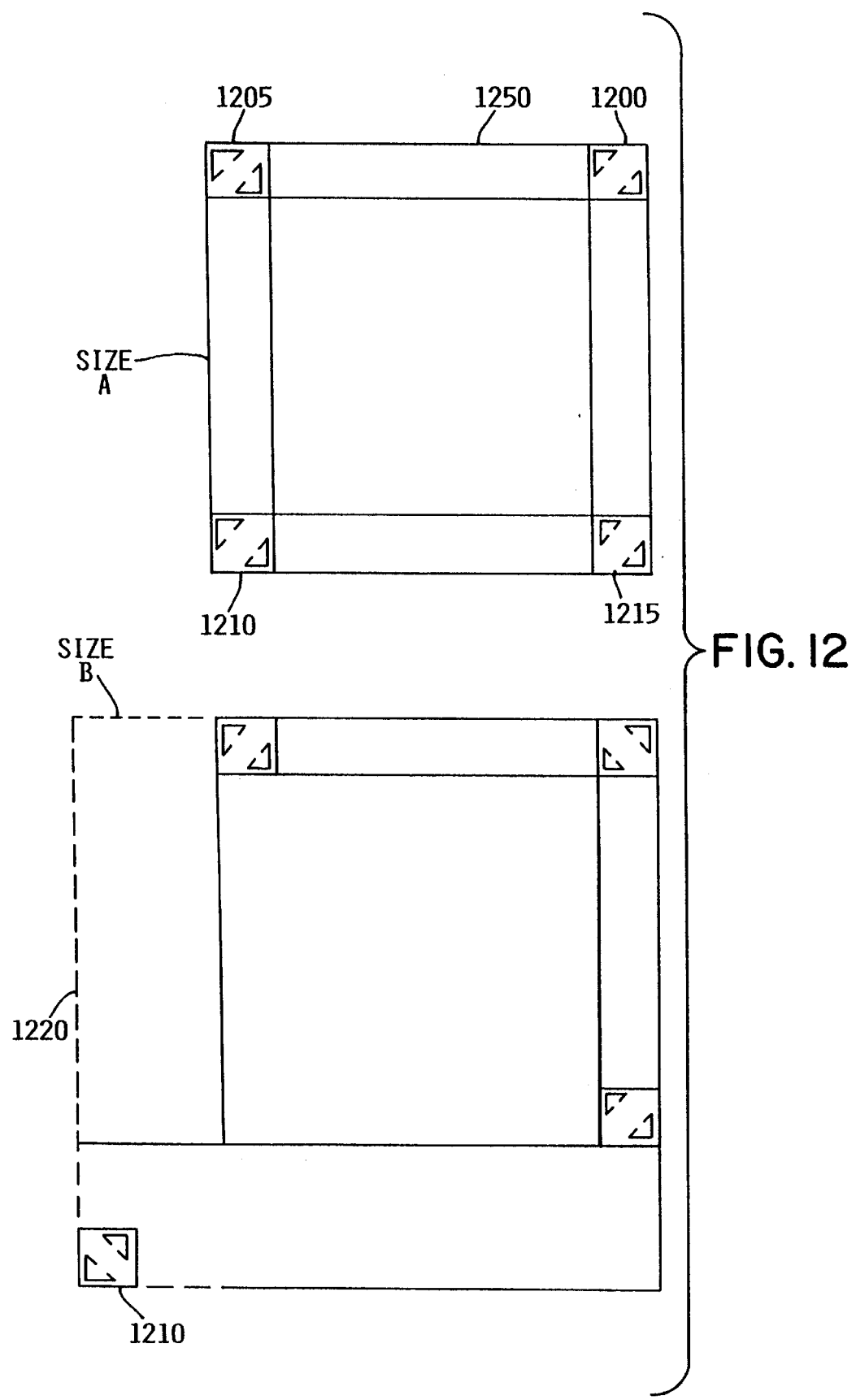
FIG. 12 shows an example of a resizing operation.

FIG. 4 shows the viewable object list, handle list, and line list data structures according to the preferred embodiment. While the data structures depicted in FIG. 4 will be fully explained in conjunction with the description of FIGS. 5–13, an overview is provided here as a convenience to the reader. Viewable Object List 124 comprises several object entries. Each entry contains a pointer (i.e., location information) that points to a handle list structure. For example, object 1 points to handle list 405. Handle list 405 comprises several handle entries. There is one handle entry for each handle on a viewable object. For example, if object 1 represented window 210, handle list 405 would have four handle entries (i.e., one for each of the handles shown on FIG. 2). However, it should be understood that in some cases it may be beneficial to represent a single handle with a single object. For example, resize handles, which will be discussed in greater detail in the text accompanying FIG. 12, are treated herein as individual objects so as to better process event routing.

Each handle entry includes important information about the character and state of its corresponding handle. In particular, handle entries each contain bounding box information (e.g., bounding box 406), which is used to determine when processing for the associated handle may be appropriate; enter line information (e.g., enter line information 407), which is used to determine when a cursor tracks across the enter line of the associated handle [for example, see enter line 315 of handle 225 (FIG. 3)]; gate line information (e.g., gate line information 408), which is used to determine when a cursor tracks across the gate line of the associated handle [for example, see gate line 320 of handle 225 (FIG. 3)]; line list location information (e.g., line list information 409), which is used to gain access to an associated line list data structure; button type information (e.g., button type information 410), which is used to specify actions associated with a particular button; and state information (e.g., state information 411), which indicates the state of the associated handle.

Line list structure 420 comprises a series of records. Each record comprises location information about the various border and display lines that make up the geometric shape of the handle. For example, if it were assumed that the geometric shape shown on FIG. 3 was that of window handle 225, line list structure 420 would include seven records, each of which would represent a single display line/border line set. At this juncture, it is again important to point out that those skilled in the art will appreciate that the present invention is not limited to a particular geometric shape or class of geometric shapes. For example, while the example geometric shapes used herein are made of a series of lines, those skilled in the art will appreciate that use of other, non-linear shapes also falls within the spirit and scope of the present invention.

Move Processing

The way in which a window is moved will be explained through use of a specific example. A user, fictitiously named Matthew, will move window 210 from location A on display 200 to location B on display 200 (please see FIG. 2). As previously discussed, Matthew will move window 210 by moving cursor 240 into window handle 225 and then moving window 210 to location B. For the purposes of explaining move processing, assume that window 210 corresponds to object 1 on FIG. 4 and that window handle 225 is represented by handle entry 1 on FIG. 4. Assume further that window handle 225 has the geometric shape of the object handle depicted on FIG. 3.

Figure 5:
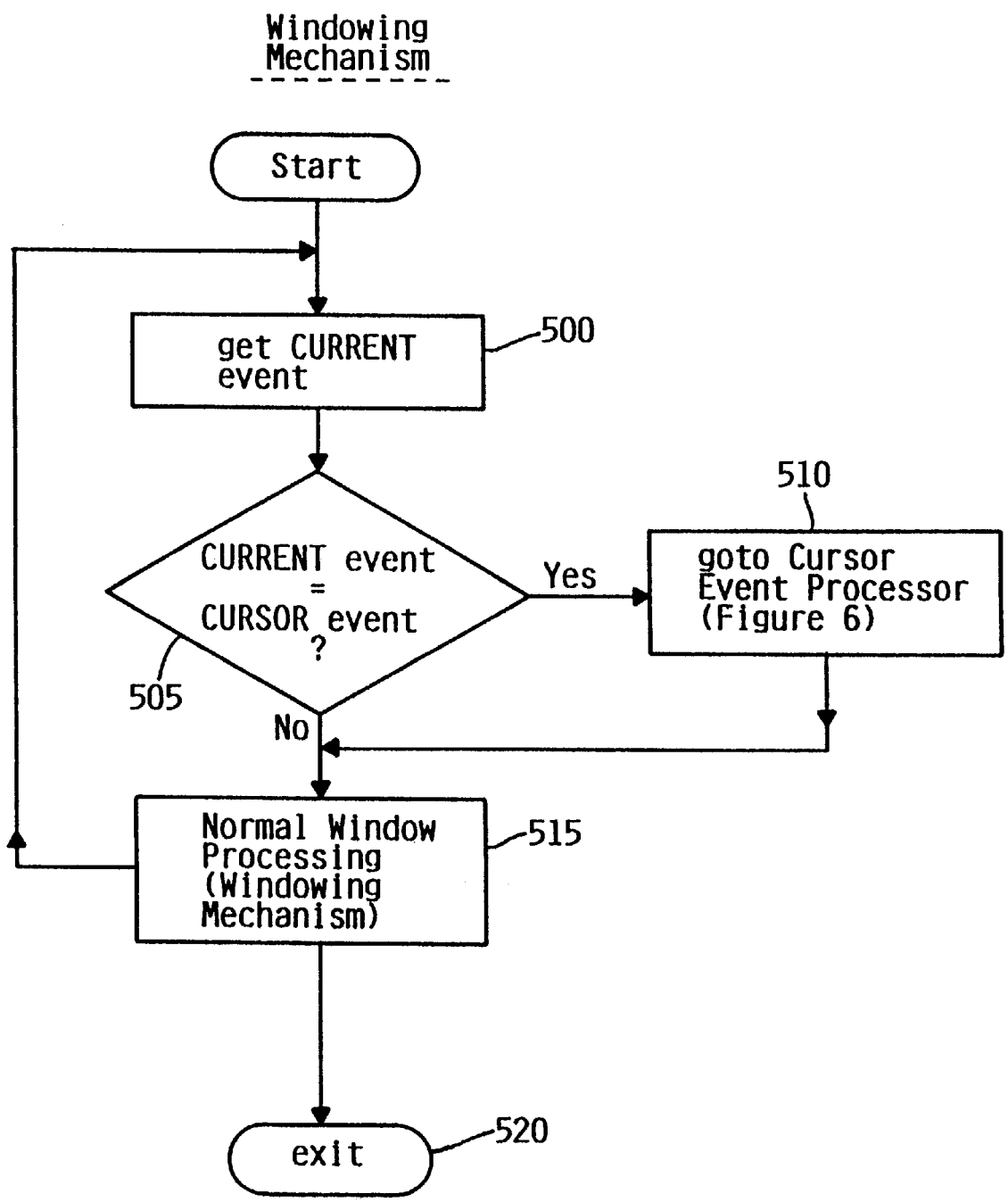
FIG. 5 is a flow diagram of a Viewable Object Processor constructed to carry out steps of the present invention according to the preferred embodiment.

FIG. 5 is a flow diagram of a Viewable Object Processor constructed to carry out steps of the present invention according to the preferred embodiment. Viewable Object Processor 111 receives events in block 500. Since the particular way in which events are generated and received (i.e., through pointing device interface 147) is not important to the present invention, a detailed explanation of event generation is not included within this specification. However, it should be pointed out that all of the events that are generated on display 200 are initially handled by windowing mechanism 110. Windowing mechanism 110 then routes the events to the Viewable Object Processor associated with the object. In the case of this example, the viewable object is window 210.

Once an event is received in block 500, Viewable Object Processor 111 determines whether the event is a cursor event [block 505]. If the event is not a cursor event, Viewable Object Processor 515 proceeds with normal window processing [block 515]. Normal window processing includes activities such as refreshing a window, moving a window to and from the background, etc. Since in this case Matthew's movement of cursor 240 (i.e., through a pointing device connected to pointing device interface 147) is a cursor event, Viewable Object Processor 111 initiates cursor event processor 112 [block 510].

Figure 6:
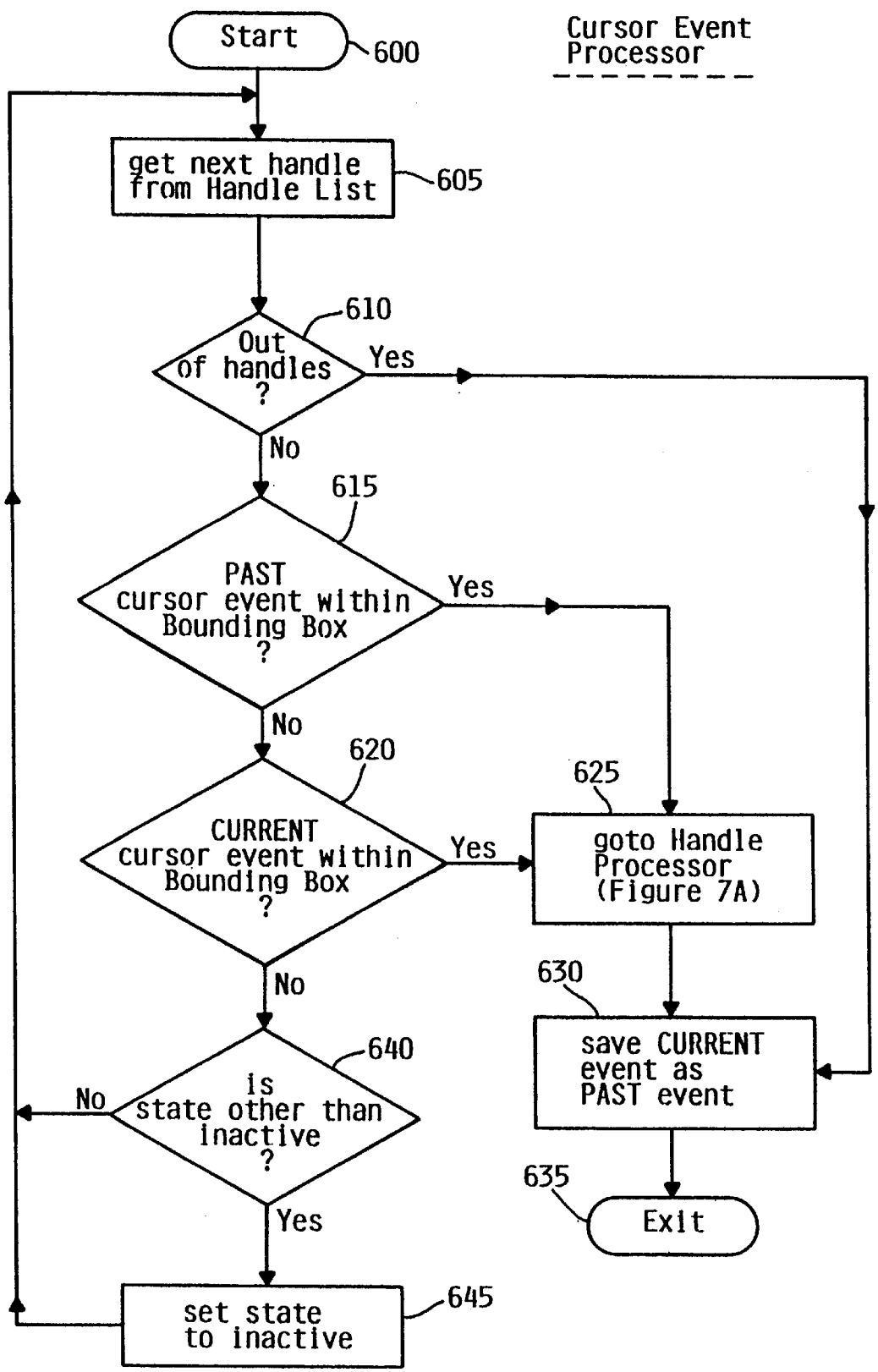
FIG. 6 is a flow diagram of a cursor event processor constructed to carry out steps of the present invention according to the preferred embodiment.

FIG. 6 is a flow diagram of a cursor event processor constructed to carry out steps of the present invention according to the preferred embodiment. Cursor event processor 112 starts in block 600 and proceeds to get the first handle from the handle list that is associated with the object (i.e., window handle 225 in this case) [block 605]. To accomplish this, cursor event processor 112 accesses object list 124 (FIG. 4), locates the correct object in the list (i.e., window 210 in this case), and then proceeds to access the associated handle list via the location information contained within the object's entry. In doing so, cursor event processor 112 is determining whether the cursor event generated by Matthew's action comes from a location on display 200 that currently corresponds to a viewable object handle.

Upon investigation of the handle list, cursor event processor 112 first determines whether there are additional handle entries. Since this is the first event associated with Matthew's movement, cursor event processor 112 will find that there are indeed further handle entries to consider [block 615]. Cursor event processor 112 will next determine whether the past cursor event was within the bounding box associated with handle 1 (see FIG. 4). As mentioned, bounding boxes are used to determine whether processing may be requires for a particular handle. This is accomplished by calculating a square, as determined by the diagonal points PT1 and PT2 (see FIG. 4), and determining whether the event in question is within the calculated box. For the purposes of this example, assume that the past cursor event is not within the bounding box associated with window handle 225. Cursor event processor 112 then determines whether the current cursor event is within the calculated bounding box of window handle 225 [block 620]. For the purposes of this example, assume that the current cursor event is similarly not within the bounding box associated with window handle 225. This being the case, cursor event processor 112 will continue to iterate through blocks 605, 610, 615, and 620 until it has checked all of the handle entries for window 210. Blocks 640 and 645 are in place because, while rare, it is possible for handles to become activated erroneously.

Once cursor event processor determines that there are no more handle entries in handle list 405, it will exit the loop [block 610], save the current event as the past event, and exit [block 635]. As Matthew continues to move cursor 240 toward window handle 225, Viewable Object Processor 111 and cursor event processor 112 will continue to receive and process the associated cursor events in the same fashion as has been described above. However, once Matthew tracks cursor 240 into a bounding box (i.e., the bounding box associated with window handle 225 in this case), the cursor event will be trapped in block 620 of cursor event processor 112. This will cause cursor event processor 112 to initiate handle processor 114 [block 625].

Figure 7A:
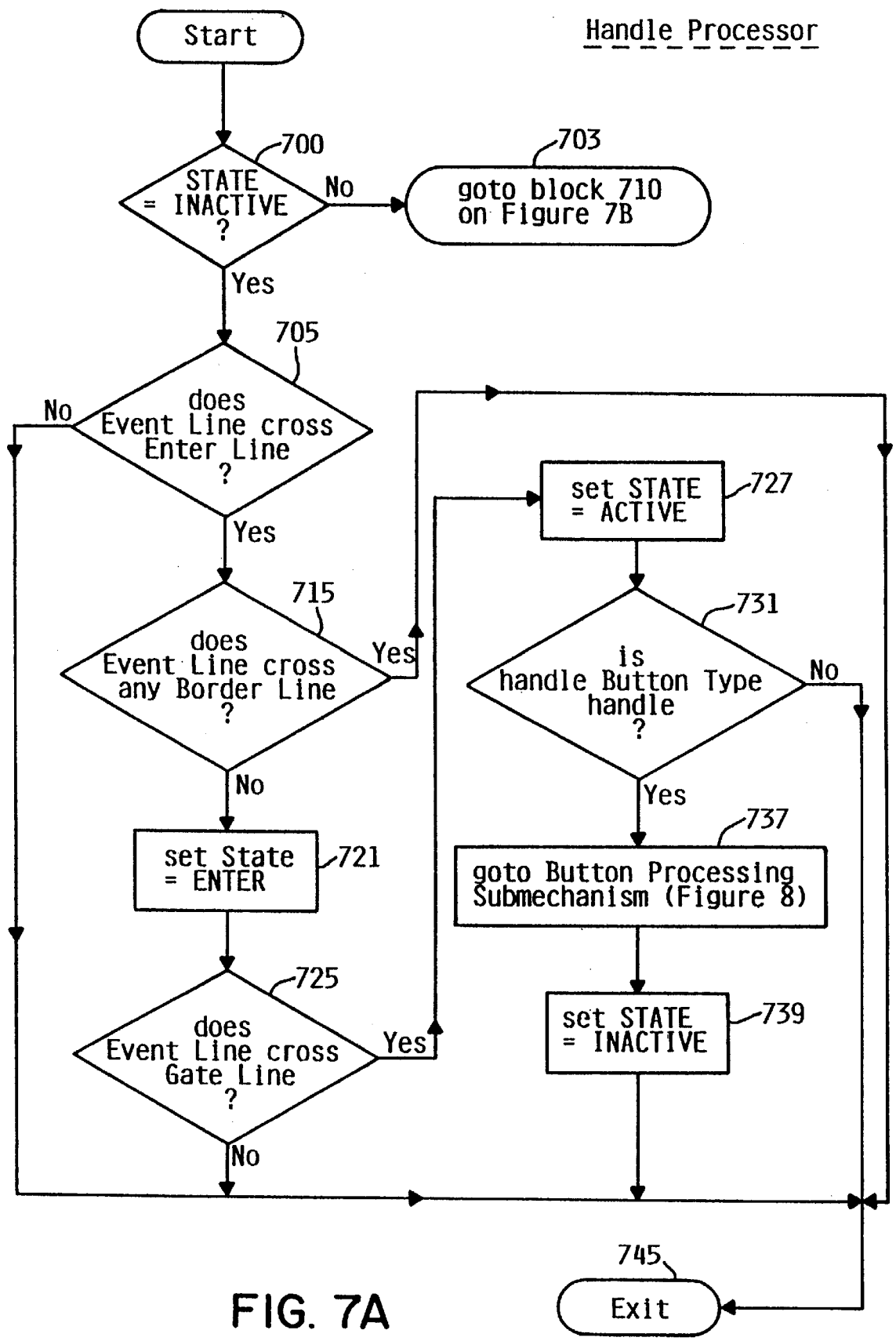
FIGS. 7A and 7B are flow diagrams of a handle processor constructed to carry out steps of the present invention according to the preferred embodiment.
Figures 1, 7B:
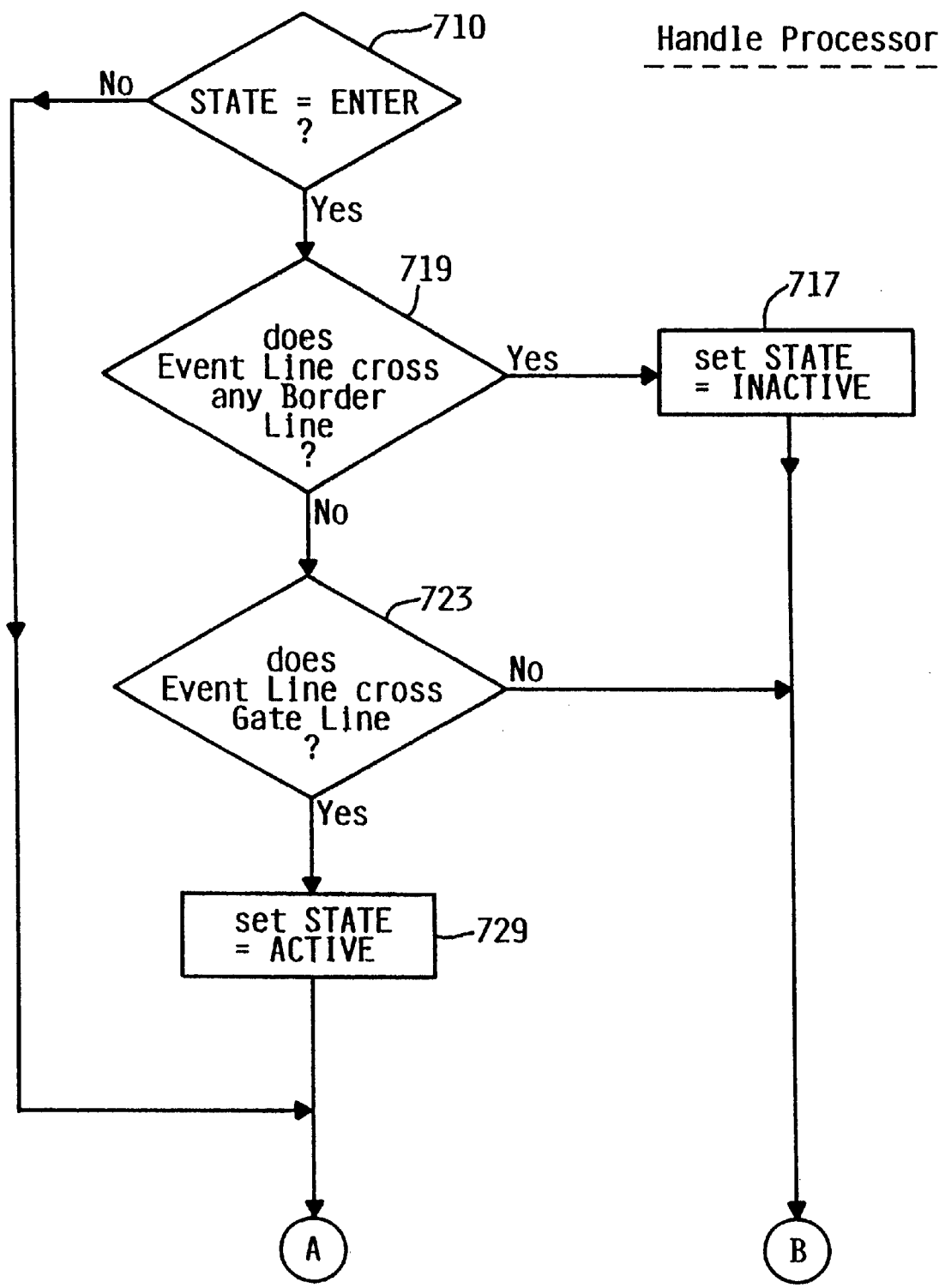

FIGS. 7A and 7B are flow diagrams of a handle processor constructed to carry out steps of the present invention according to the preferred embodiment. Handle processor 114 first determines whether the subject handle is in the active state or in the inactive state [block 700, FIG. 7A]. Handle processor 114 determines this by referring to the state information stored in the handle entry for the subject handle (see handle entry 1 on FIG. 4).

Handles designed according to the preferred embodiment have three states: inactive, enter, and active. Handles are "inactive" most of the time since users spend most of their time working within windows and moving from one window to another. Consequently, a handle is considered inactive whenever it is not performing the operation it was designed to perform and whenever the mechanisms of the present invention are certain that an operation is not about to be initiated. A handle is placed in the "enter" state whenever the mechanisms of the present invention have determined that an operation is about to be initiated. This occurs when the user tracks the cursor across an enter line. A handle in the "active" state is one that is currently performing the operation for which it was constructed. For example, a window handle would be in the active state whenever it was actively moving a window.

In this explanation, handle processor 114 will determine that window handle 225 is in the inactive state [block 700] because Matthew has just now moved cursor 240 into the bounding box associated with window 225. In other words, this is the first cursor event that was received that was generated from within a bounding box. Handle processor 114 will next determine whether the event line crosses the enter line [block 705]. The event line is the line created between the location of the past cursor event (see block 630 on FIG. 6) and the location of the current cursor event and the enter line is the line that goes across the entrance of the object handle. In this example the enter line in question (i.e., that for window handle 225) is enter line 315 (see FIG. 3). Since Matthew wants to move window 210, assume that Matthew has caused the cursor to track across enter line 315. This will cause handle processor 114 to determine whether the event line has crossed a border line (i.e., whether cursor 240 has been made to cross a border line) [block 715].

If the event line (again, the line between the past and current cursor events) does cross over a border line, handle processor 114 would exit in block 745. Handle processor 114 terminates execution in this situation because it interprets these events to mean that the user is merely tracking the cursor across the object handle (i.e., across an enter line and a border line), and does not wish to activate the object handle. For the purposes of this example, assume that the event line associated with Matthew's cursor event does not cross a border line. This being the case, handle processor 114 sets window handle 225 to the enter state [block 721], and determines whether the event line crosses gate line 320 [block 725]. Here it is important to point out that because of the geometric shape of window handle 225 (as shown on FIG. 3) there is no real practical way gate line 320 could have also been crossed at this stage in the processing. The capability to go directly to handle processing at this point (i.e., blocks 727 and 731) is in place to facilitate use of geometric shapes which have enter lines and gate lines which overlap (see, for example object handles 1305 and 1315 on FIG. 13). Accordingly, assume here that the event line associated with Matthew's last two cursor events does not cross over gate line 320. This will cause handle processor 114 to return control to cursor event processor 112 [block 745]. Cursor event processor 112 saves the current event in the PAST event variable [block 630 on FIG. 6] and then returns to Viewable Object Processor 111 [block 635]. Viewable Object Processor 111 will then perform its normal window processing [block 515 on FIG. 5] and terminate execution [block 520].

Continuing the example, assume that Matthew's movement eventually causes cursor 240 to track beyond gate line 320. This event will again be received by windowing mechanism 110 (please see FIG. 5) and passed to cursor event processor 112. Cursor event processor 112 will determine that the last event to come from cursor 240 (i.e., the event recorded as PAST) occurred within a bounding box [block 615] and initiate handle processor 114 [block 625]. With this event, handle processor 114 will determine that handle 225 is not in the inactive state [block 700]and then determine whether handle 225 is in the enter state [block 710, FIG. 7B]. Since in this example handle 225 was previously set to the enter state, handle processor 114 will next determine whether the event line crosses a border line [block 719]. If the event line does cross over a border line, handle processor 114 would set the handle's state to inactive [block 717] and exit in block 745. For the purposes of this example, assume that the event line associated with Matthew's cursor event does not cross a border line. This being the case, handle processor 114 next determines whether the event line crosses gate line 320 [block 723]. Since Matthew has moved cursor 240 across gate line 320, handle processor 114 sets window handle 225 to the active state [block 729] and determines whether the event line crosses back over the enter line [block 735]. Handle processor 114 will next determine whether the subject handle is a button type handle [block 751]. Handle processor 114 determines the handle type by reference to the button type information in the handle entry for the handle (i.e., button handle 230 in this case). If the object handle has a specific action associated with it (i.e., as prescribed in the button type information field), it is considered a button type handle. Since in this case, window handle 225 is not a button type handle, handle processor 114 initiates move processing submechanism 118 [block 743].

Figure 9:
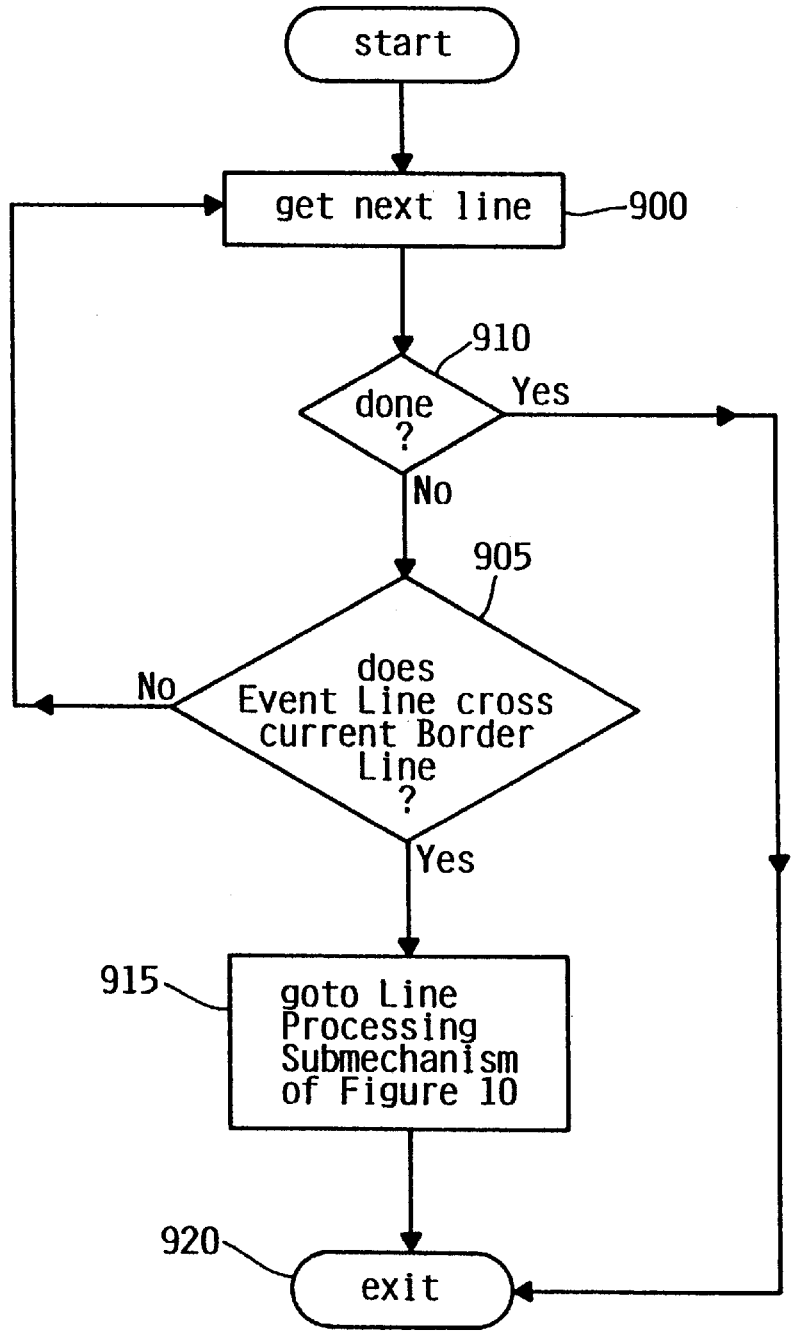
FIG. 9 is a flow diagram of a move processing submechanism constructed to carry out steps of the present invention according to the preferred embodiment.

FIG. 9 is a flow diagram of a move processing submechanism constructed to carry out steps of the present invention according to the preferred embodiment. When move processing submechanism 118 is initiated, it first gets the next line in block 900. To accomplish this, move processing submechanism 118 will access the line list associated with the subject object handle (i.e., line list 420 of FIG. 4 in this case). As mentioned, each line construct (e.g., 425, 430, and 435) represents a segment of the border and display lines that make up the geometric shape of a viewable object handle. Move processing submechanism 118 will iterate through each line (as represented by the line constructs) until it either locates a border line that is crossed by the event line [block 905] or determines that there are no more lines to check [block 910]. If move processing submechanism 118 is unable to fetch an additional line, move processing submechanism 118 will exit [block 920]. Since in this case, Matthew's movement of cursor 240 tracked across enter line 315 and gate line 320, but did not cross and border line (see block 719 on FIG. 7B), move processing submechanism 118 will run out of lines in block 900 without detecting that the event line crossed a border line in block 905. Accordingly, move processing submechanism 118 will exit in block 920.

Assume here that Matthew's next cursor movement does intersect with a border line. This event will again be received by windowing mechanism 110 (please see FIG. 5) and passed to cursor event processor 112. Cursor event processor 112 will determine that the last event to come from cursor 240 (i.e., the event recorded as PAST) occurred within a bounding box [block 615] and initiate handle processor 114 [block 625]. With this event, handle processor 114 will determine that handle 225 is not in the inactive state [block 700] and then determine whether handle 225 is in the enter state [block 710, FIG. 7B]. Since in this example handle 225 was previously set to the active state, handle processor 114 will proceed directly to block 735 where it will determine whether the event line crosses a the enter line. Since the event line does not cross the enter line, handle processor 114 will next determine whether the subject handle is a button type handle [block 751]. Since in this case, window handle 225 is not a button type handle, handle processor 114 again initiates move processing submechanism 118 [block 743].

When move processing submechanism 118 is initiated (FIG. 9), it again checks whether the event line crosses any of the border lines [blocks 900, 910, and 905]. Since in this case the event line does cross one of the border lines of window handle 225, move processing submechanism 118 will initiate line processing submechanism 120.

Figure 10:
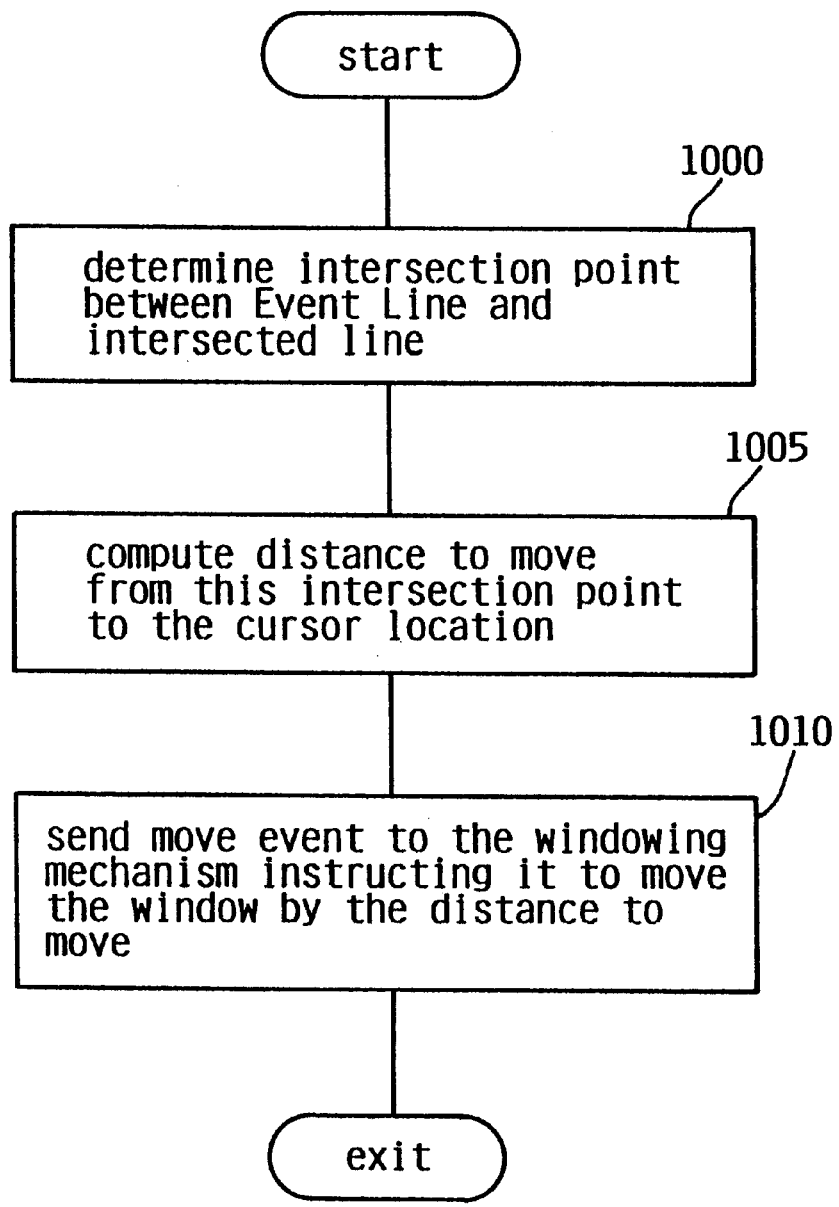
FIG. 10 is a flow diagram of a line processing submechanism constructed to carry out steps of the present invention accordingly to the preferred embodiment.
Figure 11:
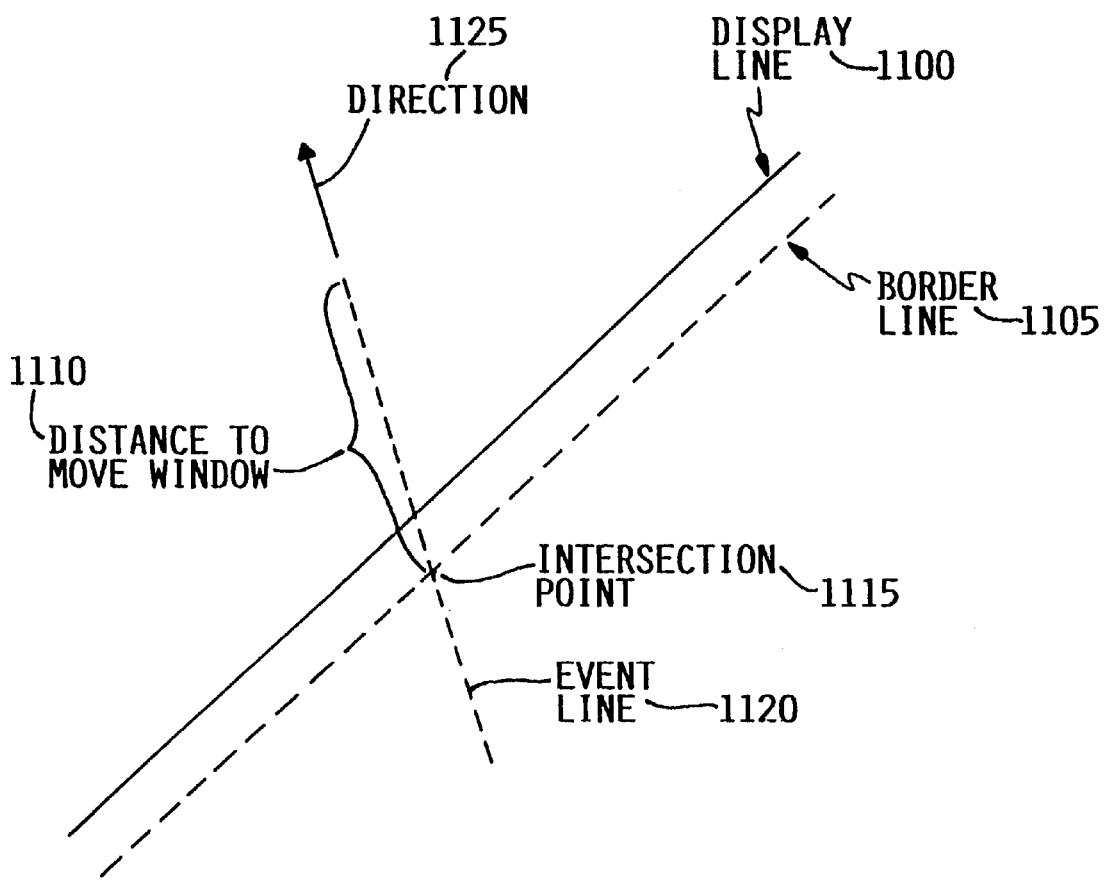
FIG. 11 shows how the move and line processing submechanisms of FIGS. 9 and 10 determine the distance that a window should be moved.

FIG. 10 is a flow diagram of a line processing submechanism constructed to carry out steps of the present invention according to the preferred embodiment. Once initiated, line processing submechanism 120, determines the intersection point between the event line and the intersected line [block 1000]. For example, see intersection point 1115 on FIG. 11. Line processing submechanism 120 then calculates the distance to move window 210 and the direction that window 210 is to be moved [block 1005]. For example, see distance to move 1110 and direction 1125 on FIG. 11. Line processing submechanism 120 then sends a move event to windowing mechanism 110 instructing it to move window 210 the calculated distance and direction. Since the precise mechanism or mechanisms used to actually move windows and/or to perform other basic windowing functions is not important to the present invention, a detailed explanation of these functions is not included in this specification. Having sent the message, line processing submechanism 120 returns to move processing submechanism 118 [block 1020], which eventually causes control to be returned to Viewable Object Processor 111 (i.e., through handle processor 114 and cursor event processor 112).

Figures 2, 7B:
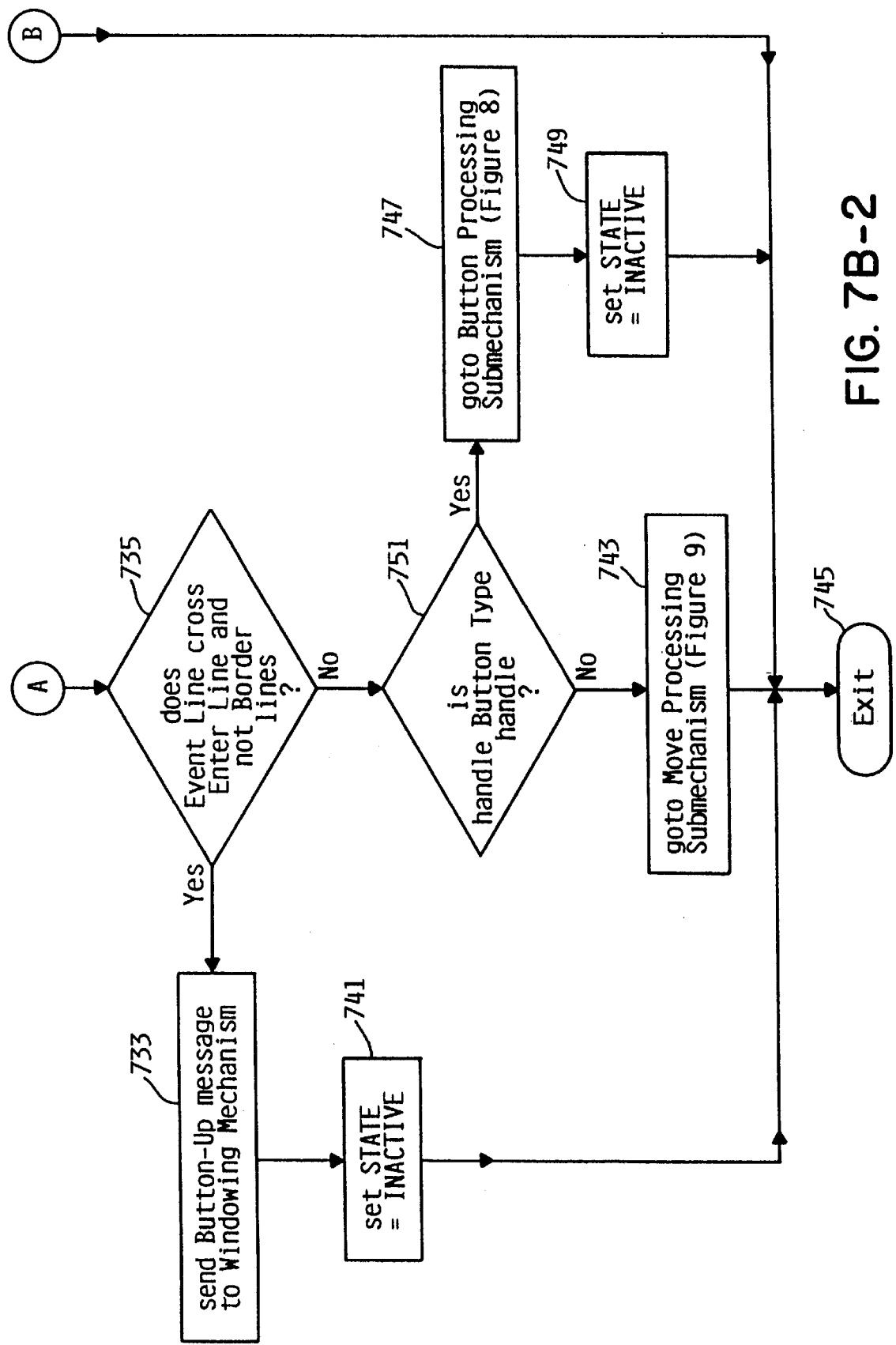
Figure 8:
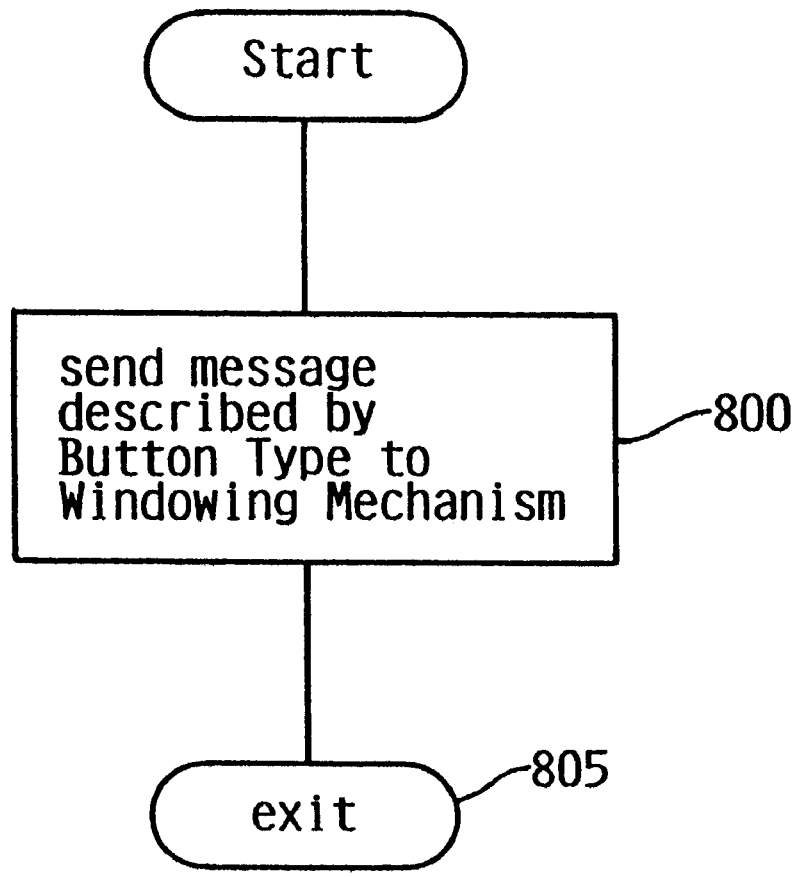
FIG. 8 is a flow diagram of a button processing submechanism constructed to carry out steps of the present invention according to the preferred embodiment.

As Matthew continues to move window 210, handle processor 114 will continue to process the associated events by repeatedly initiating move processing submechanism 118 (see block 743 on FIG. 8). Once window 210 has been moved to the desired location, Matthew terminates the movement by causing cursor 240 to track back across enter line 315. This action will be detected by handle processor 114 in block 735 (see FIG. 7). Upon determining that the event line has crossed back over enter line 315, handle processor 114 will send a button-up message to windowing mechanism 110. The button-up message, which essentially simulates a user's button release on a pointing device, signals the end of the operation. Handle processor 114 then sets the state of window handle 225 to inactive and returns control to cursor event processor 112, which itself returns control to Viewable Object Processor 111.

Button Processing

Button processing is handled in much the same way as move processing. For the purposes of explaining button processing, assume that Matthew has decided to activate one of the functions associated with button handle 230 on window 210 (see FIG. 2). Also assume that window 210 corresponds to object 1 on FIG. 4 and that window handle 225 is represented by handle entry 1 on FIG. 4 and that window handle 225 has the geometric shape of the object handle depicted on FIG. 3.

As with move processing, Viewable Object Processor 111 receives events in block 500 (FIG. 5) and determines whether the event is a cursor event [block 505]. Since Matthew's movement of cursor 240 is a cursor event, Viewable Object Processor 111 initiates cursor event processor 112 [block 510].

Cursor event processor 112 proceeds to get the first handle from the handle list associated with the object (i.e., window 210 in this case) via object list 124 (FIG. 4) [block 605]. Once again cursor event processor 112 is determining whether the cursor event generated by Matthew's action comes from a location on display 200 that currently corresponds to a viewable object handle. Cursor event processor 112 will again initiate handle processor 114 once it determines that a cursor event is within the bounding box associated with button handle 230.

As with move processing, handle processor 114 first determines whether the subject handle is in the active state or in the inactive state [block 700 on FIG. 7]. Handle processor 114 determines this by referring to the state information stored in the handle entry for the button handle 230 (see handle 1 on FIG. 4).

As with the example of window handle 225, handle processor 114 will determine that button handle 230 is in the inactive state [block 700] because it is being assumed that Matthew has just now moved cursor 240 into the bounding box associated with button handle 230. Handle processor 114 will next determine whether the event line crosses the enter line [block 705]. Assume here that Matthew has caused the cursor to track across the enter line of button handle 230. This will cause handle processor 114 to move to block 715 where it will determine whether the event line has crossed a border line (i.e., whether cursor 240 has been made to cross a border line).

Assume here that the event line associated with Matthew's cursor event does not cross a border line. This being the case, handle processor 114 sets button handle 230 to enter [block 721] and determines whether the event line crosses the gate line associated with button handle 320 (not shown) [block 725]. Here it is important to point out that because of the geometric shape of window handle 225 (as shown on FIG. 3) there is no real practical way gate line 230 could have also been crossed at this stage in the processing. The capability to go directly to handle processing at this point (i.e., blocks 727, 731, 737, and 739) is in place to facilitate use of geometric shapes which have enter lines and gate lines which overlap (see, for example object handles 1305 and 1315 on FIG. 13). Accordingly, assume here that the event line associated with Matthew's last two cursor events does not cross over gate line 320. This will cause handle processor 114 to return control to cursor event processor 112 [block 745]. Cursor event processor 112 saves the current event in the PAST event variable [block 630 on FIG. 6] and then returns to Viewable Object Processor 111 [block 635]. Viewable Object Processor 111 will then perform its normal window processing [block 515 on FIG. 5] and terminate execution [block 520].

Continuing the example, assume that Matthew's movement eventually causes cursor 240 to track beyond gate line 320. This event will again be received by windowing mechanism 110 (please see FIG. 5) and passed to cursor event processor 112. Cursor event processor 112 will determine that the last event to come from cursor 240 (i.e., the event recorded as PAST) occurred within a bounding box [block 615] and initiate handle processor 114 [block 625]. With this event, handle processor 114 will determine that handle 225 is not in the inactive state [block 700] and then determine whether handle 225 is in the enter state [block 710]. Since in this example handle 225 was previously set to the enter state, handle processor 114 will next determine whether the event line crosses a border line [block 719]. If the event line does cross over a border line, handle processor 114 would set the handle's state to inactive [block 717] and exit in block 745. For the purposes of this example, assume that the event line associated with Matthew's cursor event does not cross a border line. This being the case, handle processor 114 next determines whether the event line crosses gate line 320 [block 723]. Assume that the event line associated with Matthew's last two cursor events does indeed cross over the gate line associated with button handle 320. Handle processor 114 will then set the state of button handle 230 to active [block 729] and next determine whether the subject handle is a button type handle [block 751]. Handle processor 114 determines the handle type by reference to the button type information in the handle entry for the handle (i.e., button handle 230 in this case). If the object handle has a specific action associated with it (i.e., as prescribed in the button type information field), it is considered a button type handle. Since in this case, button handle 230 is a button type handle, handle processor 114 initiates button processing submechanism 116 in block 747.

FIG. 8 is a flow diagram of a button processing submechanism constructed to carry out steps of the present invention accordingly to the preferred embodiment. In block 800, button processing submechanism 116 sends a message to windowing mechanism 110 instructing it to perform the action identified in the button type information field. Those skilled in the art will appreciate that there are any number of actions that can be (and are) initiated by this function. For example, if the program running in window 210 were a word processing mechanism the action associated with button handle 230 would likely be display of a menu. The menu would offer several options to the user and each option would itself have an associated button handle for carrying out the requisite action (e.g., save, print, etc.).

Once button processing submechanism 116 has sent the appropriate message to windowing mechanism 110, it returns control to handle processor 114 [block 805]. Handle processor 114, having requested that the appropriate action be taken, sets the state of button handle 230 to inactive [block 749] and returns control to cursor event processor 112 [block 745]. Cursor event processor 112 then eventually returns control to Viewable Object Processor 111 [block 635].

Resize Processing

In addition to providing window movement and button processing, the mechanisms of the present invention also provide window resizing. FIG. 12 shows an example of resizing window 1250 from that shown as Size A to that shown as Size B. Resizing is accomplished through resizing handles such as resizing handle pair 1210. Resizing handle pair 1210 has two handles, one to make window 1250 larger and one to make window 1250 smaller. To resize a window, a user need only move their cursor into a handle of this type and then move the handle in the direction that the resize is to occur. For example a user could use the outer handle of resize handle pair 1210 to make window 1250 larger.

Since the mechanisms used to perform resizing are very similar to those previously described (i.e., for window and button processing), their details will not be reiterated here. However, it is worthwhile to point out that, as mentioned, resize handle pairs are a case where each handle can be best represented as a single object. This stems from the fact that many existing windowing mechanisms (e.g. windowing mechanism 110) scope events to viewable objects (e.g., windows) such that it may be difficult to trap cursor events that occur outside the viewable object. For example, when a user performs a enlarging resize operation on window 1250 (i.e., through the use of the outer handle of resize handle pair 1210), many of the cursor events will be generated from locations outside of window 1210. Windowing mechanisms which scope events to viewable objects would either send the events to the wrong window or they would not know where to send the events at all. However, if each resize handle pair was represented by a single object (i.e., instead of as one handle of many associated with a viewable object), the windowing mechanism would not misroute the events because they would all be generated within the object (the resize handle pair in this case).

Alternate Geometric Shapes

FIG. 13 shows alternate geometric shapes that could be made to operate with the mechanisms of the present invention. Handles 1305 and 1315 are examples of handles that have merged enter and gate lines. Handles 1310 and 1320 are examples of handles that have separated enter and gate lines.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer display apparatus, said computer display apparatus comprising:
   a display screen;
   an input mechanism for moving a position identifier, said input mechanism being capable of generating cursor events;
   a windowing mechanism capable of displaying at least one viewable object on said display screen;
   a computer program associated with said viewable object; and
   a Viewable Object Processor that allows a user to manipulate said at least one viewable object by using only said cursor events, said cursor events being generated when said position identifier is moved into a specialized region via a specialized path.

2. The computer display apparatus of claim 1 wherein said at least one viewable object further comprises at least one object handle.

3. The computer display apparatus of claim 2 wherein said at least one viewable object is a window and wherein said at least one object handle is a window handle, said window handle allowing said user to move said window by moving said position identifier into said specialized region.

4. The computer display apparatus of claim 2 wherein said at least one viewable object is a window and wherein said at least one object handle is a button handle, said button handle allowing said user to activate operations associated with said computer program.

5. The computer display apparatus of claim 2 wherein said at least one viewable object is a window and wherein said at least one object handle is a resize handle pair, said resize handle pair allowing said user to resize said window by moving said position identifier into said specialized region.

6. A computer apparatus, said computer apparatus comprising:

a central processing unit;

data storage;

at least one bus;

a display screen;

an input mechanism for moving a position identifier, said input mechanism being capable of generating cursor events;

a windowing mechanism capable of displaying at least one viewable object on said display screen;

a computer program associated with said viewable object; and a Viewable Object Processor that allows a user to manipulate said at least one viewable object by using only said cursor events, said cursor events being generated when said position identifier is moved into a specialized region via a specialized path.

7. The computer apparatus of claim 6 wherein said at least one viewable object further comprises at least one object handle.

8. The computer apparatus of claim 7 wherein said at least one viewable object is a window and wherein said at least one object handle is a window handle, said window handle allowing said user to move said window by moving said position identifier into said specialized region.

9. The computer apparatus of claim 7 wherein said at least one viewable object is a window and wherein said at least one object handle is a button handle, said button handle allowing said user to activate operations associated with said computer program.

10. The computer apparatus of claim 7 wherein said at least one viewable object is a window and wherein said at least one object handle is a resize handle pair, said resize handle pair allowing said user to resize said window by moving said position identifier into said specialized region.

11. A computer-implemented method for manipulating viewable objects on a display screen of a computer apparatus, said method comprising the step of:

moving a position identifier via a specialized path into a specialized region on said display screen, said specialized region being associated with at least one of said viewable objects, said specialized path being contained within said specialized region.

12. The method of claim 11 wherein said at least one viewable object further comprises at least one object handle.

13. The method of claim 12 wherein said at least one viewable object is a window and wherein said at least one object handle is a window handle, said window handle allowing said user to move said window by moving said position identifier into said specialized region.

14. The method of claim 12 wherein said at least one viewable object is a window and wherein said at least one object handle is a button handle, said button handle allowing said user to activate operations associated with a computer program.

15. The method of claim 12 wherein said at least one viewable object is a window and wherein said at least one object handle is a resize handle pair, said resize handle pair allowing said user to resize said window by moving said position identifier into said specialized region.

16. A program product, said program product comprising:

a Viewable Object Processor that allows a user to manipulate a viewable object by using only cursor events, said cursor events being generated when a position identifier is moved into a specialized region via a specialized path; and recordable media bearing said Viewable Object Processor.

17. The program product of claim 16 wherein said viewable object further comprises at least one object handle.

18. The program product of claim 17 wherein said viewable object is a window and wherein said at least one object handle is a window handle, said window handle allowing said user to move said window by moving said position identifier into said specialized region.

19. The program product of claim 17 wherein said viewable object is a window and wherein said at least one object handle is a button handle, said button handle allowing said user to activate operations associated with a computer program.

20. The program product of claim 17 wherein said at least one viewable object is a window and wherein said at least one object handle is a resize handle pair, said resize handle pair allowing said user to resize said window by moving said position identifier into said specialized region.

* * * * *